United States Patent

Goto et al.

Patent Number: 5,512,363
Date of Patent: Apr. 30, 1996

[54] MAGNETIC RECORDING MEDIUM HAVING A MAGNETIC LAYER CONTAINING MAGNETIC POWDER AND AN UNDERLAYER CONTAINING TWO KINDS OF NON MAGNETIC POWDER

[75] Inventors: Narito Goto; Noboru Koyama; Hisato Kato, all of Hino, Japan

[73] Assignee: Konica Corporaton, Japan

[21] Appl. No.: 404,936

[22] Filed: Mar. 14, 1995

Related U.S. Application Data

[63] Continuation of Ser. No. 12,722, Feb. 3, 1993, abandoned.

[30] Foreign Application Priority Data

Feb. 13, 1992 [JP] Japan ..................... 4-026978
Mar. 25, 1992 [JP] Japan ..................... 4-067389
Apr. 2, 1992 [JP] Japan ..................... 110775

[51] Int. Cl.$^6$ ..................... G11B 5/00
[52] U.S. Cl. ................. 428/323; 428/328; 428/329; 428/336; 428/694 BH; 428/694 BS; 428/900
[58] Field of Search ................. 428/694, 900, 428/336, 328, 329, 323, 694 BS, 694 BH

[56] References Cited

U.S. PATENT DOCUMENTS

| | | | |
|---|---|---|---|
| 3,959,553 | 5/1976 | Hartmann et al. | 428/329 |
| 4,528,240 | 7/1985 | Miyoshi et al. | 428/323 |
| 4,582,757 | 4/1986 | Miyoshi et al. | 428/329 |
| 4,724,172 | 2/1988 | Mosser et al. | 427/383.5 |
| 4,746,558 | 5/1988 | Shimozawa et al. | 428/141 |
| 4,863,793 | 9/1989 | Ogawa et al. | 428/323 |

*Primary Examiner*—Stevan A. Resan
*Attorney, Agent, or Firm*—Jordan B. Bierman; Bierman and Muserlian

[57] ABSTRACT

Disclosed is a magnetic recording medium comprising a non-magnetic support having thereon a plurality of layers, wherein an outermost layer is a magnetic layer having a thickness of less than 0.5 μm, and layers other than the outermost layer contain two or more kinds of non-magnetic powder having different average particle sizes.

The magnetic recording medium has high durability in running under high temperature and high humidity.

6 Claims, 2 Drawing Sheets

MAGNETIC RECORDING MEDIUM HAVING A MAGNETIC LAYER CONTAINING MAGNETIC POWDER AND AN UNDERLAYER CONTAINING TWO KINDS OF NON MAGNETIC POWDER

This application is a continuation, of application Ser. No. 08/012,772, filed Feb. 3, 1993, now abandoned.

FIELD OF THE INVENTION

The present invention relates to a magnetic recording medium, and more particularly, to a magnetic recording medium having excellent characteristics such as high durability in running under high temperature and high humidity, no head clogging at low temperature and no calender contamination.

BACKGROUND OF THE INVENTION

In recent years, a technical trend for a magnetic recording medium has been changed from analog recording to digital recording. In digital recording such as that in a digital VTR, recording in a region of a short wavelength is basically important and recording in a region of a long wavelength is not needed. Therefore, a thickness of a magnetic layer in a magnetic recording medium that is not more than 0.5 μm is enough.

Incidentally, a multi-layer magnetic recording medium consisting of a magnetic layer and a layer that is provided under the magnetic layer and contains non-magnetic powder is disclosed in Japanese Patent Publication Open to Public Inspection No. 187418/1988 (hereinafter referred to as Japanese Patent O.P.I. Publication).

In the multi-layer magnetic recording medium described in the official gazette, however, it has been difficult to control the surface roughness of a lower layer because only one kind of non-magnetic powder is used in the lower layer and a magnetic layer that is an upper layer is comparatively thick and it has been difficult to control, by controlling the surface roughness of the lower layer, the roughness on the surface of the magnetic layer. Therefore, it has been difficult to improve running durability of the magnetic recording medium and to improve prevention of calender contamination.

SUMMARY OF THE INVENTION

The invention has been achieved in view of the situation mentioned above.

Namely, an object of the invention is to provide a magnetic recording medium having excellent characteristics such as high durability in running under high temperature and high humidity, no head clogging at low temperature and no calender contamination. Another object of the invention is to provide a magnetic recording medium excellent in various characteristics such as a CN characteristic, overwrite characteristic, surface specific resistance and light transmission factor. The aforementioned objects of the invention have been achieved by a magnetic recording medium comprising a non-magnetic support having thereon a plurality of layers wherein a magnetic layer that is an outermost layer contains hexagonal system tabular particle powder or ferromagnetic metal powder, a thickness of the magnetic layer is not more than 0.5 μm, at least one layer other than the outermost layer contains non-magnetic powder or high transmission factor substances, and a thickness of a layer containing said non-magnetic powder or said substances is not more than 0.5 μm.

EXPLANATION OF SYMBOLS

2. Support
10. Extrusion coater
11. Extrusion coater
32. Feeding roll
33. Magnet for orientating
34. Drier
37. Super calender unit
38. Calender roll
39. Take-up roll

DETAILED DESCRIPTION OF THE PREFERRED EMBODIMENT

A preferable embodiment is a magnetic recording medium wherein coercive force Hc of the aforementioned high transmission factor substance satisfies the condition of $$0 < Hc \leq 1.0 \times 10^4 \text{ (A/m)}$$

and radius $R_1$ of the aforementioned non-magnetic powder and thickness $T_1$ of the layer containing the non-magnetic powder satisfy the condition of $$0 < R_1 < \tfrac{1}{2} T_1.$$

The invention described in Claim 1 for achieving the aforementioned objects is a magnetic recording medium comprising a non-magnetic support having thereon a plurality of layers, wherein an outermost layer is a magnetic layer having a thickness of less than 0.5 μm, and layers other than the outermost layer contain two or more kinds of non-magnetic powder having different average particle sizes, the invention described in Claim 2 is the magnetic recording medium according to Claim 1, wherein said magnetic layer that is an outermost layer contains ferromagnetic metal powder and/or ferrite powder of a hexagonal system, the invention described in Claim 3 is the magnetic recording medium according to Claim 1, wherein a layer adjoining said outermost layer contains two or more kinds of non-magnetic powder having different average particle sizes, the invention described in Claim 4 is the magnetic recording medium according to Claim 1, wherein the outermost layer constitutes together with a plurality of layers and an average particle size of non-magnetic powder contained in a layer adjoining the outermost layer is larger than that of non-magnetic powder contained in layers other than the layer adjoining the outermost layer, the invention described in Claim 5 is the magnetic recording medium according to Claim 1, wherein a difference of an average particle size between two or more kinds of non-magnetic powder contained in layers other than said outermost layer is not less than 10 mμ, and the invention described in Claim 6 is The magnetic recording medium according to Claim 1, wherein non-magnetic powder contained in layers other than the outermost layer is composed of non-magnetic powder having an average particle size of 10–30 nm and non-magnetic powder having an average particle size of not less than 40 nm.

CONCRETE CONSTITUTION OF THE INVENTION

The above-mentioned requirement is met by the invention wherein at least one layer other than an outermost layer contains non-magnetic powder or highly magnetic-permeable substances A having an average particle size of $A_1$ (nm) and conductive powder B having an average particle size of $B_1$ (nm) both satisfying the conditions of $$10 \times T \leq A_1 \leq 200 \times T$$

$$10 \times T \leq B_1 \leq 200 \times T$$

for thickness T (μm) of the outermost magnetic layer, and the thickness T satisfies the condition of $$T \leq 0.8$$

and more preferably the condition of $$T \leq 0.5.$$

Further, the constitution of the invention, offers another effect that satisfactory coatability can be obtained.

The thinner a thickness of an outermost layer is, the greater influence the surface nature of a lower layer has on the surface nature of the outermost layer. Therefore, it is important that the particle size of a filler contained in the lower layer satisfies the above-mentioned inequalities. It is further necessary, for the high density recording, to eliminate additives other than magnetic powder from a magnetic layer as far as possible, and to transfer functions to a lower layer. In this connection, it is preferable that conductive powder is contained in a lower layer, and it is also preferable that the particle size of the conductive powder satisfies the above-mentioned relations. It is more preferable that the condition of $$0.2 \times A_1 \leq B_1 \leq 3 \times A_1$$

is satisfied.

It is possible to further improve calenderbility by making the weight ratio of conductive powder B to non-magnetic powder or to highly magnetic-permeable substances A to be 1-20% by weight.

It is further possible to improve running durability by making the weight ratio of non-magnetic powder or high transmission factor substance A conductive powder B to be 1-20% by weight.

The invention described in the aforementioned Claim 11 for solving the problems mentioned above is the magnetic recording medium according to Claim 1, wherein a lower layer including at least one non-magnetic layer containing two or more kinds of non-magnetic powder having different particle sizes and an outermost layer consisting of a magnetic layer containing ferromagnetic powder are laminated in this order on the non-magnetic support, an average length of a major axis of a particle of the ferromagnetic powder in the outermost layer is less than 0.25 μm, the condition of $$L_0 \leq 250 \text{ (Å)}$$

is satisfied when a crystallite size measured in an X-ray analysis method is $L_0$, and the conditions of $$0 < L_N < L_{N-1} < \ldots < L_2 < L_1 \leq 700 \text{ (Å)},$$

and $$5 \times 10^{(3-N)}/(N+2) \leq L_N \leq 7 \times 10^{(3-N)}/N \text{ (Å)}$$

are satisfied when crystallite sizes of two or more kinds of non-magnetic powder having different particle sizes in the non-magnetic layer measured in an X-ray analysis method are $L_1, L_2, \ldots, L_{N-1}, L_N$. The invention described in Claim 12 os a magnetic recording medium according to Claim 11 mentioned above wherein at least non-magnetic powder having a crystallite size of $L_1$ is contained, the invention described in Claim 13 is a magnetic recording medium according to Claim 11 mentioned above wherein the relation of $100 \leq L_0 \leq 250$ (Å) is satisfied when a crystallite size of ferromagnetic powder in the aforementioned outermost layer measured through an X-ray diffraction method is assumed to be $L_0$, while the invention described in the above-mentioned Claim 14 is the magnetic recording medium according to Claim 11, wherein the outermost layer is formed while the lower layer is wet by wet-on wet method.

The invention will be explained in detail as follows.

The magnetic recording medium of the invention is one wherein a plurality of magnetic layers are provided on a non-magnetic support and the outermost layer and layers other than the outermost layer contain specific magnetic particles and each layer has its own surface roughness on its surface and own layer thickness.

LAYER STRUCTURE

The magnetic recording medium of the invention basically comprises a non-magnetic support having thereon an outermost layer that is a magnetic layer and at least one layer sandwiched between the outermost layer and the non-magnetic support.

Incidentally, it is preferable to provide a back-coating layer on the side (reverse side) of the non-magnetic support where the above-mentioned magnetic layer is not provided for the purpose of improving the running characteristic of the magnetic recording medium and of preventing charging and transferring. A subbing layer may also be provided between the magnetic layer and the non-magnetic support.

As a material for forming the above-mentioned non-magnetic support, there may be given, for example, polyesters such as polyethylene terephthalate and polyethylene-2,6-naphthalate, polyolefins such as polypropylene, cellulose derivatives such as cellulosetriacetate and cellulosediacetate, and plastics such as polyamide and polycarbonate.

A shape of the above-mentioned non-magnetic support is not limited in particular and tape-shaped, film-shaped, sheet-shaped, disc-shaped or drum-shaped ones are primarily used.

A thickness of the non-magnetic support is not limited in particular, and it is usually 3–100 μm and preferably 5–50 μm for the film-shaped or sheet-shaped non-magnetic support, for example, and it is about 30 μm–10 mm for the disc-shaped or card-shaped one, while it is selected properly according to a recorder or the like in the case of the drum-shaped non-magnetic support.

In this connection, the non-magnetic support may be either of a mono-layer structure or of a multi-layer structure. Further, the non-magnetic support may be the one which has been subjected to surface treatment such as corona discharge treatment.

Incidentally, it is preferable to provide a back-coating layer on the side (reverse side) of the non-magnetic support where the above-mentioned magnetic layer is not provided for the purpose of improving the running characteristic of the magnetic recording medium and of preventing charging and transferring. A subbing layer may also be provided between the magnetic layer and the non-magnetic support.

MAGNETIC LAYER

In the invention, an outermost layer is a magnetic layer in which magnetic powder is basically dispersed in binder resins.

The magnetic layer that is an outermost layer contains therein ferromagnetic powder and/or magnetic powder of a hexagonal system. A layer thickness of the outermost layer is not more than 0.5 μm and preferably is 0.1–0.4 μm. A layer thickness of at least one layer other than the outermost layer is usually 4.0 μm or less, and it is preferable to be not more than 2.0 μm and more preferable to be 0.5 μm or less. When these conditions are satisfied, the characteristic in a region of high frequency of the magnetic recording medium of the invention can be improved.

As ferromagnetic metal powder used for the outermost layer, there may be given ferromagnetic powder such as metallic magnetic powder containing primarily Fe, Ni and Co in types of Fe—Al, Fe—Al—Ni, Fe—Al—Zn, Fe—Al—Co, Fe—Al—Ca, Fe—Ni, Fe—Ni—Al, Fe—Ni—Co, Fe—Ni—Si—Al—Mn, Fe—Ni—Si—Al—Zn, Fe—Al—Si, Fe—Ni—Zn, Fe—Ni—Mn, Fe—Ni—Si, Fe—Mn—Zn, Fe—Co—Ni—P and Ni—Co as well as Fe and Co. Among them, Fe-type metallic powder is excellent in electric characteristics.

From the viewpoint of corrosion resistance and dispersibility, on the other hand, Fe—Al type metallic powder in the types of Fe—Al, Fe—Al—Ca, Fe—Al—Ni, Fe—Al—Zn, Fe—Al—Co, Fe—Ni—Si—Al—Zn or Fe—Ni—Si—Al—Mn is preferable.

Ferromagnetic metal powder that is preferable in particular for the object of the invention, is metallic magnetic powder whose principal ingredient is Fe, and practical examples thereof which are desirable include magnetic powder that contains Fe and Al in the range of weight ratio of Fe:Al=100:0.5–100:20 with regard to Al and and magnetic powder that contains Fe, Al and Ca in the range of weight ratio of Fe:Al=100:0.5–100:20 with regard to Al and in the range of weight ratio of Fe:Ca=100:0.1–100:10 with regard to Ca.

The ratio of Fe:Al that is in the range mentioned above can improve remarkably the corrosion resistance and the ratio of Fe:Ca being in the aforementioned range can improve the electromagnetic converting characteristic and can reduce dropout. Causes for an improvement in electromagnetic converting characteristic and for reduction of drop-out are not clear, but increased coercive force caused by an improvement in dispersibility as well as reduced coagula are considered as causes.

With regard to the ferromagnetic metal powder used in the invention, it is preferable that an average length of a major axis thereof is less than 0.25 μm, especially 0.10–0.22 μm and it is preferably 0.10–0.17 μm, while a crystal size is less than 200 Å, and 100–180 Å is especially preferable. When the average length of a major axis and the crystal size of the ferromagnetic metal powder are within the ranges mentioned above, it is further possible to improve the electromagnetic converting characteristic.

It is preferable that a coercive force (Hc) of the ferromagnetic metal powder used in the invention is normally within a range of 600–5,000 Oe. When the coercive force is less than 600 Oe, there is a possibility that the electromagnetic converting characteristic is deteriorated, while when it exceeds 5,000 Oe, there is a possibility that an ordinary head can not record, both of which are not preferable.

It is further preferable that a magnetic characteristic of saturation magnetization amount ($\sigma s$) of the above-mentioned ferromagnetic powder is usually 70 emu/g or more. When the saturation magnetization amount is less than 70 emu/g, there is a possibility that the electromagnetic converting characteristic is deteriorated.

In the invention, ferromagnetic powder having specific surface area of not less than 30 m$^2$/g, especially of 45 m$^2$/g based on a BET method is preferably used to cope with higher density recording.

With regard to the specific surface area and a measurement method therefor, details are described in "Measurement for powder" (written under joint authorship of J. M. Dallavelle and Clyeorr Jr. translated by Muta and others and published by Sangyo Tosho Co.) and also are described in "Chemical Handbook" pages 1170–1171 on Applied Chemistry (compiled by Japan Chemistry Association; published by Maruzen on Apr. 30, 1966).

In measurement of the specific surface area, powder is deaerated while being subjected to heat treatment for 13 minutes at about 105° C., for example, so that those adsorbed on the powder may be removed. After that the powder is led to the measuring instrument where the initial pressure of nitrogen is set to 0.5 kg/m$^2$, and measurement is conducted by means of nitrogen for 10 minutes at the temperature of liquid nitrogen (−105° C.).

Quanta-sorb (made by Yuasa Iionics Co.), for example, is used as a measuring instrument to be used.

With regard to axial ratio Ra of the ferromagnetic metal powder used suitably for the invention, it is preferable that the axial ratio Ra is within a range of $1.3 \leq Ra \leq 4.5$. The axial ratio Ra is a ratio of a major axis to a minor axis in terms of length of the ferromagnetic metal powder and it is expressed in a form of Ra=(length of major axis)/(length of minor axis). Ra of the conventional ferromagnetic metal powder used to be about 10 frequently for increasing Hc based on shape anisotropy. However, slender particles of the ferromagnetic powder have tended to be broken frequently during dispersing and kneading of the powder and distribution of Hc have been formed frequently in a magnetic layer. In the invention, however the problems mentioned above can be solved by the Ra regulated to be within the aforementioned range.

As a preferable practical example of the ferromagnetic metal powder used in the invention, there may be given Fe—Al type ferromagnetic metal powder.

For a magnetic layer of the magnetic recording medium of the invention, it is possible to use magnetic powder of a hexagonal system.

As magnetic powder of a hexagonal system, ferrite of a hexagonal system, for example, may be cited. Such ferrite of a hexagonal system is composed of barium ferrite, strontium ferrite and others, and a part of an Fe element may be substituted with other elements (for example, Ti, Co, Zn, In, Mn, Ge, Nb etc.). As for the ferrite magnetic body, details are described in IEEE Trans.on MAG-18 16 (1982).

As magnetic powder of a hexagonal system that is especially preferable in the invention, there may be given barium ferrite (hereinafter referred to as Ba-ferrite) magnetic powder.

Ba-ferrite magnetic powder preferably used in the invention consists of Ba-ferrite wherein a part of Fe in the Ba-ferrite powder is substituted with at least Co and Zn, an average particle size (length of a diagonal line of a plate of ferrite of a hexagonal system) is within a range of 400–900 Å, a tabular ratio (a value obtained by dividing a length of a diagonal line of a plate of ferrite of a hexagonal system by a plate thickness) is 2.0–10.0, more preferably 2.0–6.0, and coercive force (Hc) is 450–1500 Oe.

The Ba-ferrite powder is regulated, through partial substitution of Fe thereof by means of Co, so that it may have an optimum value of coercive force. Through further substitution by means of Zn, it is possible to realize high saturation magnetization which can not be obtained by substitution by means of Co alone, and a magnetic recording medium which has high reproduction output and is excellent in an electromagnetic converting characteristic can be obtained. Further, by substituting a part of Fe with Nb, it is possible to obtain a magnetic recording medium having higher reproduction output and an excellent electromagnetic converting characteristic. Incidentally, with regard to the Ba-ferrite used in the invention, a part of Fe thereof may further be substituted with transition metals such as Ti, In, Mn, Cu, Ge, Sn and others.

Incidentally, the Ba-ferrite used for the invention is represented by the following formula.

$$BaO \cdot n (Fe_{1-m}Mm)_2O_3)$$

In the formula, the relation of m>3.6 is satisfied provided that the conditions of Co+Zn=0.08–0.3 and Co/Zn=0.5–10 are satisfied, n represents 5.4–11.0, preferably 5.4–6.0, M represents substituting metals, and magnetic particles wherein two or more kinds of elements with an average valence number of 3 are combined are preferable.

The reasons why it is preferable that an average particle size, a tabular ratio and coercive force of B-ferrite are within the aforementioned preferable range in the invention are as follows. Namely, when the average particle size is less than 400 Å, reproduction output of a magnetic recording medium is insufficient, while when it exceeds 900 Å, surface smoothness of a magnetic recording medium is remarkably deteriorated and a noise level sometimes becomes too high. When a tabular ratio is less than 2.0, a vertical orientation rate of a magnetic recording medium that is suitable for high density recording can not be obtained, while when it exceeds 10.0 on the contrary, surface smoothness of a magnetic recording medium is remarkably deteriorated and a noise level becomes too high. Further, when coercive force is less than 350 Oe, it becomes difficult to maintain recording signals, while when it exceeds 200 Oe, saturation reduction takes place in a head limit and it becomes difficult to record.

With regard to magnetic powder of a hexagonal system used in the invention, it is preferable saturation magnetization amount ($\sigma_s$) which is a magnetic characteristic of the magnetic powder usually is not less than 50 emu/g. When the saturation magnetization amount is less than 50 emu/g, an electromagnetic converting characteristic is sometimes deteriorated.

As a preferable concrete example of the Ba-ferrite used in the invention, Ba-ferrite substituted with Co can be cited.

As a method for producing magnetic powder of a hexagonal system used in the invention, there may be available a coprecipitation-baking method, a hydrothermal synthesizing method, a flux method, an alkoxide method and a plasma jet method as well as a glass crystallization method wherein oxides of various element necessary for forming the aimed Ba-ferrite and carbonated products, for example, are melted together with glass forming substances such as boric acid, for example, the melted liquid thus obtained is cooled rapidly so that glass may be formed, then the glass is subjected to heat treatment at the predetermined temperature so that crystal powder of the aimed Ba-ferrite may be precipitated, and glass components are removed finally through heat treatment.

In the invention, ferromagnetic metal powder and magnetic poser of a hexagonal system may further be used after being mixed.

Content of ferromagnetic metal powder and/or magnetic powder of a hexagonal system in the magnetic layer is usually 50–99% by weight and is preferably 60–99% by weight.

LAYER ADJOINING THE OUTERMOST LAYER

At least one layer adjoins the outermost layer. In the layer adjoining the outermost layer, two or more kinds of non-magnetic powder having different average particle sizes are contained. Owing to two or more kinds of non-magnetic power having different average particle sizes contained, non-magnetic powder having an average particle size of large sizes causes the surface of the layer adjoining the outermost layer to be a rough surface and the surface condition of this layer is reflected on the surface of the outermost layer as it is, thus an improvement of the running durability of the magnetic recording medium can be achieved. Further, owing to filled non-magnetic powder having large and small particle sizes, an amount of filled non-magnetic powder can be increased and calenderbility can be improved, which is advantageous.

As a method for causing a layer other than the outermost layer to contain two or more kinds of non-magnetic powder having different particle sizes, the following optimum embodiments can be given. Namely, there may be given the first embodiment wherein at least one layer other than the outermost layer contains non-magnetic powder having an average particle size of large particles and non-magnetic powder having an average particle size of small particles, and the second embodiment wherein a layer other than the outermost layer is composed of at least two layers and the layer adjoining the outermost layer contains non-magnetic powder having an average particle size of large particles and the layer under the layer adjoining the outermost layer contains non-magnetic powder having an average particle size of small particles.

In any of the first and the second embodiments mentioned above, it is desirable that a difference of an average particle size between non-magnetic powder having an average particle size of large particles and non-magnetic powder having an average particle size of small particles is not less than 10 nm, preferably not less than 30 nm and more preferably not less than 50 nm. Such difference of an average particle size can control, together with a layer thickness of the outermost layer which is not more than 0.5 µm, the roughness on the surface of a magnetic layer caused by non-magnetic powder having an average particle size of large particles, thereby an improvement in running durability under high temperature and high humidity and prevention of head clogging at low temperature can be achieved, resulting in an excellent magnetic recording medium for digital recording use.

Though there is no limitation in particular for the average particle size of non-magnetic powder having an average particle size of large particles as far as it has the above-mentioned difference of particle size against non-magnetic powder having an average particle size of small particles, the average particle size is usually 40 nm or more. Further, though there is no limitation in particular for the average particle size of non-magnetic powder having an average particle size of small particles as far as it has the above-mentioned difference of particle size against non-magnetic powder having an average particle size of large particles, the average particle size is usually 10–30 nm.

Incidentally, a layer containing non-magnetic powder other than a magnetic layer that is an outermost layer functions as a layer for supplying lubricant to the magnetic layer that is an outermost layer because a layer thickness of the magnetic layer is not more than 0.5 μm. For the reason that a layer under the magnetic layer functions fully as a lubricant-supplying layer, it is preferable that oil content of non-magnetic powder contained in a layer under the magnetic layer is low as far as possible, and it is usually not more than 200 ml/100 g, preferably not more than 100 ml/100 g.

As non-magnetic powder in the invention, those having the aforementioned characteristics may be used after being selected properly from various known non-magnetic powder used for magnetic recording media of this kind. The non-magnetic powder includes, for example, carbon black, graphite, titanium oxide, barium sulfide, ZnS, $MgCO_3$, $CaCO_3$, ZnO, CaO, γ-iron oxide, tungsten disulfide, molybdenum disulfide, boron nitride, MgO, $SnO_2$, $SiO_2$, $Cr_2O_3$, α-$Al_2O_3$, SiC, cerium oxide, corundum, artificial diamond, α-iron oxide, garnet, silicon dioxide, silicon nitride, boron nitride, silicon carbide, molybdenum carbide, boron carbide, tungsten carbide, titanium carbide, tripoly, diatomaceous earth, and dolomite.

Those especially preferable among non-magnetic powder mentioned above include inorganic powder such as carbon black, $CaCo_3$, titanium oxide, barium sulfide, γ-iron oxide, α-$Al_2O_3$, and α-iron oxide, and polymer powder such as polyethylene.

Coercive force Hc of a material having high magnetic-permeability satisfies $0 \leq Hc \leq 1.0 \times 10^4$ [A/m], and preferably satisfies $0 < Hc \leq 5.0 \times 10^3$ [A/m]. When the coercive force is within the aforementioned range, an effect of stabilizing the magnetic area of the outermost layer as a material having high magnetic permeability can be shown. When the coercive force exceeds the aforementioned range, the desired characteristics can not be obtained due to the appearance of the characteristics as magnetic materials, which is not desirable.

In the invention, it is preferable that materials whose coercive force is within the aforementioned range are selected properly as materials having high magnetic permeability. Such materials having high magnetic permeability include, for example, metallic soft magnetic materials and oxidic soft magnetic materials.

As the aforementioned metallic soft magnetic material, there may be given Fe—Si alloy, Fe—Al alloy (Alperm, Alfemol and Alfer), Permalloy (Ni—Fe type binary alloy and polyphyletic alloy wherein Mo, Cu or Cr is added to the Ni—Fe type alloy), Sendust (Fe—Si—Al [composition including Fe with Si of 9.6% by weight and Al of 5.4% by weight]) and Fe—Co alloy. Among those mentioned above, the preferable one is Sendust. Metallic soft magnetic materials as a material having high magnetic permeability are not limited to those exemplified above, and other metallic soft magnetic materials can be used. Highly magnetic-permeable materials can be used either independently in terms of a kind thereof or in combination of two or more kinds.

As the oxidic soft magnetic materials mentioned above, there may be given $MnFe_2O_4$ that is ferrite of a spinel type, $Fe_3O_4$, $CoFe_2O_4$, $NiFe_2O_4$, $MgFe_2O_4$, $Li_{0.5}Fe_{2.5}O_4$, Mn—Zn type ferrite, Ni—Zn type ferrite, Ni—Cu type ferrite, Cu—Zn type ferrite, Mg—Zn type ferrite and Li—Zn type ferrite. Among them, Mn—Zn type ferrite and Ni—Zn type ferrite are preferable. These oxidic soft magnetic materials can be used either independently in terms of a kind thereof or in combination of two or more kinds.

It is preferable that these highly magnetic-permeable materials are powdered finely so that a particle size thereof may be within a range of 1 mμ–1,000 mμ, especially of 1 mμ–500 mμ. The powder which is as fine as these sizes can be obtained through spraying of melted alloy in a vacuum atmosphere in the case of the metallic soft magnetic materials and through a glass crystallization method, a coprecipitation-baking method, a hydrothermal synthesizing method, a flux method, an alkoxide method and a plasma jet method in the case of the oxidic soft magnetic materials.

In layers containing the materials having high magnetic permeability, the content of the material having high magnetic permeability is 10–99% by weight, preferably 50–95% by weight and more preferably 60–90% by weight. When the content of the material having high magnetic permeability is within the aforementioned range, an effect to stabilize magnetization of the outermost layer can fully be exhibited. When the material having high magnetic permeability is less than 50% by weight, there is a possibility that an effect as a layer having high magnetic permeability can not be obtained, which is not preferable.

The magnetic recording medium of the invention contains conductive powder which is represented by those wherein a pigment such as carbon black, graphite, tin oxide, silver oxide, organic compound of silver, metallic particle such as copper powder, zinc oxide, barium nitrate or metal oxide such as titanium oxide is coated with conductive substance such as a tin oxide layer or a layer of oxidized antimony solid solution.

BINDER

With regard to a binder used for forming a magnetic layer that is an outermost layer and a layer other than the magnetic layer, vinyl chloride resins such as, for example, polyurethane, polyester and vinyl chloride copolymer are typical as a binder used for the invention. It is preferable that these resins contain a repeating unit having at least one kind of a polarity group selected from —$SO_3M$, —$OSO_3M$, —COOM and —$PO(OM^1)_2$.

In the polarity groups mentioned above, M represents a hydrogen atom or alkali metal such as Na, K, and Li and $M^1$ represents a hydrogen atom, an alkali atom such as Na, K and Li, or an alkyl group.

The polarity group mentioned above has a function to improve dispersibility of ferromagnetic powder and content thereof in resins is 0.1–8.0 mol %, and preferably 0.5–6.0 mol %. When the content is less than 0.1 mol %, the dispersibility of ferromagnetic powder is lowered, while when it exceeds 8.0 mol %, magnetic paint tends to gel. Incidentally, it is preferable that an average molecular weight in terms of weight of each of the aforementioned resins is within a range of 15,000–50,000.

Content of binding agent in a magnetic layer is normally 10–40 parts by weight for 100 parts by weight of ferromagnetic powder, and preferably 15–30 parts by weight.

Binders can be used either independently in terms of a kind thereof or in combination of two or more kinds. In this case, however, a ratio of polyurethane and/or polyester to vinyl chloride resin is in a range of 90:10–10:90 in terms of a weight ratio, and it is preferably within a range of 70:30–30:70.

Polarity-group-containing vinyl chloride copolymer used as a binding agent in the invention can be synthesized through addition reaction between a copolymer having a hydroxyl group such as, for example, vinyl chloride—vinyl alcohol copolymer and a compound having the following polarity group and a chlorine atom.

The reaction mentioned above will be explained as follows with an example of Cl—CH$_2$CH$_2$SO$_3$Na selected from the aforementioned compounds.

Polarity-group-containing vinyl chloride copolymer can be obtained through a method wherein a predetermined amount of reactive monomer having unsaturated bond to which a cycle unit containing a polarity group is introduced is prepared in a reaction vessel such as a autoclave, and ordinary polymerization starting agents, such as, for example, radical polymerization starting agents such as BPO (benzoylperoxide), AIBN (azobisisobutyronitrile), and redox polymerization starting agents or cation polymerization starting agents are used for polymerization reaction.

As a concrete example of a reactive monomer for introducing sulfonic acid or its salt, there may be given unsaturated hydrogencarbide sulfonic acid such as vinylsulfonic acid, allylsulfonic acid, methacrylsulfonic acid, or p-styrenesulfonic acid and its salt.

When introducing carboxylic acid or its salt, (metha) acrylic acid or maleic acid, for example, may be used, and when introducing phosphoric acid or its salt, (metha) acrylic acid-2-phosphoric ester, for example, may be used.

It is preferable that an epoxy group is introduced in a vinylchloride copolymer, because thermo-stability of the polymer can be improved.

When introducing an epoxy group, it is preferable that the content of an epoxy-group-containing a repeating unit in a copolymer is 1–30 mol %, and it is more preferable that the content is 1–20 mol %.

As a monomer for introducing an epoxy group, glycidyl acrylate, for example, is preferable.

With regard to technologies for introducing a polarity group into a vinylchloride copolymer, they are disclosed in Japanese Patent O.P.I. Publication Nos. 44227/1982, 108052/1983, 8127/1984, 101161/1985, 235814/1985, 238306/1985, 238371/1985, 121923/1987, 146432/1987 and 146433/1987, and the present invention also can use them.

Next, how to synthesize polyester and polyurethane used in the invention will be explained.

Generally, polyester can be obtained through reaction of polyol on polybasic acid.

Using this known method, it is possible to synthesize polyester (polyol) having a polarity group from polyol and polybasic acid having partially a polarity group.

As an example of polybasic acid having a polarity group, there may be given 5-sulfoisophthalic acid, 2-sulfoisophthalic acid, 4-sulfoisophthalic acid, 3-sulfophthalic acid, 5-sulfoisophthalic acid-dialkyl, 2-sulfoisophthalic acid-dialkyl, 4-sulfoisophthalic acid-dialkyl, 3-sulfoisophthalic acid-dialkyl and their sodium salt and potassium salt.

As an example of polyol, there may be given trimethylolpropane, hexanetriol, glycerin, trimethylolethane, neopentylglycol, pentaerythritol, ethyleneglycol, propylene glycol, 1,3-butanediol, 1,4-butanediol, 1,6-hexanediol, diethylene glycol and cyclohexanedimethanol.

Incidentally, polyester into which other polarity group is introduced can also be synthesized through known methods.

Next, how to synthesize polyurethane will be explained.

Polyurethane can be obtained through reaction of polyol on polyisocyanate.

As polyol, polyester polyol obtained through reaction of polyol on polybasic acid is generally used.

Therefore, it is possible to synthesize polyurethane having a polarity group by using polyester polyol having a polarity group as a material.

Examples of polyisocyanate include disphenylmethane-4-4'-diisocyanate (MDI), hexamethylenediisocyanate (HMDI), tolylenediisocyanate (TDI), 1,5-naphthalenediisocyanate (NDI), tolidenediisocyanate (TODI) and lysineisocyanate methyl ester (LDI).

As a method for synthesizing polyurethane having a polarity group, addition reaction of polyurethane having a hydroxyl group on the following compound having a polarity group and a chlorine atom is also effective.

Incidentally, with regard to technologies for introducing a polarity group into polyurethane, they are disclosed in Japanese Patent Examined Publication No. 41565/1983, Japanese Patent O.P.I. Publication Nos. 92422/1982, 92423/1982, 8127/1984, 5423/1984, 5424/1984 and 121923/1987, and they can be used also for the present invention.

In the invention, following resins may be used as a binder provided that an amount of the resin used is 20% by weight of all binders used.

The resins mentioned above include vinylchloride-vinyl acetate copolymer, vinylchloride-vinylidenechloride copolymer, vinylchloride-acrylonitrile copolymer, butadiene-acrylonitrile copolymer, polyamide resin, polyvinyl butyral, cellulose derivative (nitro-cellulose etc.), styrene-butadiene copolymer, phenol resin, epoxy resin, urea resin, melamine resin, phenoxy resin, silicone resin, acryl resin, ureaformamide resin and various synthetic rubber resins all of which have weight-average molecular weight of 10,000–200,000.

OTHER COMPONENTS

In the invention, it is preferable, for improving the durability of a magnetic layer, that the magnetic layer contains polyisocyanate.

The polyisocyanate includes, for example, aromatic polyisocyanate such as additional mass of tolylenediisocyanate (TDI) and active hydrogen compound and aliphatic polyisocyanate such as additional mass of hexamethylenediisocyanate (HMDI) and active hydrogen compound. It is preferable that the weight-average molecular weight of polyisocyanate is within a range of 100–3000.

In the invention, a magnetic layer can contain, if necessary, additives such as dispersing agents, lubricating agents, abrasives, antistatic agents and fillers.

The dispersing agents include fatty acid having carbon atoms of 12–18 such as caprylic acid, capric acid, lauric acid, myristic acid, palmitic acid, stearic acid and oleic acid; salts of their alkali metal or salts of their alkali earth metal, or their amide; polyalkyleneoxide alkylphosphate ester, lecithin; trialkylpolyolefinoxy quaternary ammonium salt; and azo-compound having a carboxyl group and a sufonic acid group. These dispersing agents are generally used in an amount of 0.5–5% by weight of ferromagnetic powder.

Next, as a lubricating agent, it is possible to use fatty acid and/or fatty acid ester. In this case, it is preferable that an amount of fatty acid to be added is 0.2–10% by weight of ferromagnetic powder, and it is more preferable that it is 0.5–5% by weight. When the amount of fatty acid to be added is less than 0.2% by weight, the running characteristic tends to be deteriorated, while when it exceeds 10% by weight, fatty acid tends to ooze out on the surface of a magnetic layer and output tends to be lowered.

With regard to an amount of fatty acid ester to be added, a range of 0.2–10% by weight of ferromagnetic powder is preferable and a range of 0.5–5% by weight is more preferable. When the amount of addition is less than 0.2% by weight, still-flame-durability tends to be deteriorated, while when it exceeds 10% by weight, fatty acid ester tends to ooze out on the surface of a magnetic layer and output tends to be lowered.

When it is necessary to further enhance and effect of lubrication by using fatty acid and fatty acid ester in combination, it is preferable that the weight ratio of fatty acid to fatty acid ester is within a range from 10:90 to 90:10.

The fatty acid may either be monobasic acid or be dibasic acid, and the number of carbon atoms therein in a range of 6–30 is preferable and that of 12–22 is more preferable.

Concrete examples of the fatty acid include caproic acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid and octanedicarboxylic acid.

Concrete examples of the fatty acid ester include oleylolate, isocetylstearate, dioleylmalate, butylstearate, butylpalmitate, butylmyristate, octylmyristate, octylpalmitate, pentylstearate, pentylpalmitate, isobutyloleate, stearylstearate, rauryloleate, octyloleate, isobutyloleate, ethyloleate, isotridecyloleate, 2-ethylhexylstearate, 2-ethylhexylpalmitate, isopropylpalmitate, isopropylmyristate, butyllaurate, cetyl-2-ethylhexalate, dioleiladipate, diethyladipate, diisobutyladipate, diisodecyladipate, oleilstearate, 2-ethylhexylmyristate, isopentylpalmitate, isopentylstearate, diethyleneglycol-mono-butyl etherpalmitate and diethyleneglycol-mono-butyl etherpalmitate.

As a lubricating agent other than the fatty acid and fatty acid ester mentioned above, it is also possible to use silicone oil, graphite, carbon fluoride, molybdenum disulfate, tungsten disulfate, fatty acid amide and α-olefinoxide.

Next, concrete examples of the abrasives include α-alumina, fused alumina, chromium oxide, titanium oxide, α-iron oxide, silicon oxide, silicon nitride, tungsten carbide, molybdenum carbide, boron carbide, corundum, zinc oxide, cerium oxide, magnesium oxide and boron nitride. An average particle size of abrasives preferably is within a range of 0.05–0.6 μm and more preferably is within a range of 0.1–0.3 μm.

Next, examples of antistatic agents include conductive powder such as carbon black and graphite; cation surfactant such as quaternary amine anion surfactant containing an acid radical such as sulfonic acid, sulfuric acid, phosphoric acid, phosphoric acid ester and carboxylic acid; amphoteric surfactant such as aminosulfonic acid and natural surfactant such as saponin.

The antistatic agents mentioned above are usually added in a quantity range of 0.01–40% by weight of bonding agents.

STRUCTURE OF MAGNETIC RECORDING MEDIUM

A method for manufacturing the magnetic recording medium of the invention is not limited in particular, and the magnetic recording medium can be manufactured by a known method used for manufacturing magnetic recording media of a mono-layer type or a multi-layer type.

In general, for example, ferromagnetic powder, bonding agents, dispersing agents, lubricating agents, abrasives and antistatic agents are kneaded and dispersed in solvents so that magnetic paint may be prepared, and then the magnetic paint are coated on the surface of a non-magnetic support.

Those which may be used as the aforementioned solvent include ketones such as acetone, methylethylketone (MEK), methylisobutylketone (MIBK) and cyclohexanone; alcohol such as methanol, ethanol and propanol; esters such as methyl acetate, ethyl acetate and butyl acetate; cyclic ethers such as tetrahydrofuran and hydrogen carbide halide such as methylenechloride, ethylenechloride, carbon tetrachloride, chloroform and dichlorobenzene.

For the purpose of kneading and dispersing the components of a magnetic layer, various kinds of kneaders for dispersion can be used.

As a kneader for dispersion, there may be given, for example, a twin roll mill, a tripple roll mill, a ball mill, a pebble mill, a Co-ball mill, a Tron mill, a sand mill, a sand grinder, a Sqegvari Attriter, a high-speed impeller homogenizer, a high-speed stone mill, a high-speed impact mill, Disper, a high-speed mixer, a homogenizer, a super-sonic homogenizer, an open kneader, a continuous kneader and a pressure kneader.

Among the aforementioned kneaders for dispersion, those capable of providing power consumption load of 0.05–0.5 kw (per 1 kg of magnetic powder) are a pressure kneader, an open kneader, a continuous kneader, a twin roll mill and a tripple roll mill.

Figure 1:
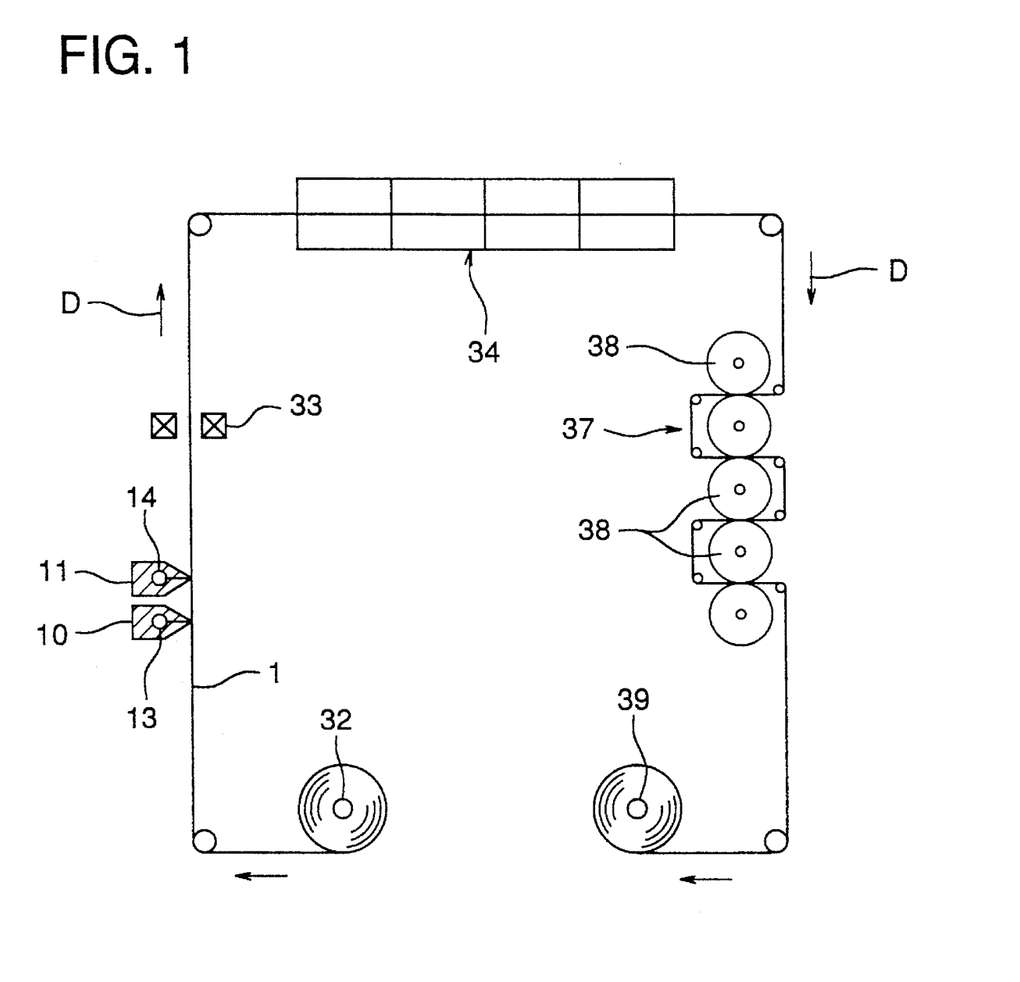
FIG. 1 is a diagram for explaining the simultaneous multi-layer coating of magnetic layers conducted through a wet-on-wet coating method.

When coating a magnetic layer on a non-magnetic support in manufacturing magnetic recording media of the invention, a simultaneous multi-layer coating by means of a wet-on-wet multi-layer coating method is preferable from the viewpoint of an effect. To be concrete, each coating for each of magnetic layers 2 and 4 is coated, by each of extrusion coaters 10 and 11 of an extrusion method, on film-shaped support 1 fed out of supply roll 32 as shown in FIG. 1, and then the support passes through orientating magnet or vertical orientating magnet 33 and is guided to drier unit 34 where the support is dried by the hot air jetted from nozzles provided at upper and lower locations. Next, dried support 1 having thereon coated layers is guided to super calender unit 37 composed of a combination of calender rolls 38 where it is subjected to calendering treatment, and then the support is taken up by take-up roll 39. The magnetic film thus prepared is slit to the shape of a tape having the desired width so that an 8 mm magnetic recording tape for a video camera, for example, may be manufactured.

In the method mentioned above, each coating may also be supplied to each of extrusion coaters 10 and 11 through an unillustrated in-line mixer. Incidentally, arrow D in the figure shows a direction for transporting the non-magnetic base film. Extrusion coaters 10 and 11 are provided respectively with bead portions 13 and 14 and each coating from each coater is superimposed on a wet-on-wet basis. Namely, immediately after the coating for the lower magnetic layer is coated (and not dried), the coating for the upper magnetic layer is coated on the lower magnetic layer on a multi-layer basis.

Figure 2A:
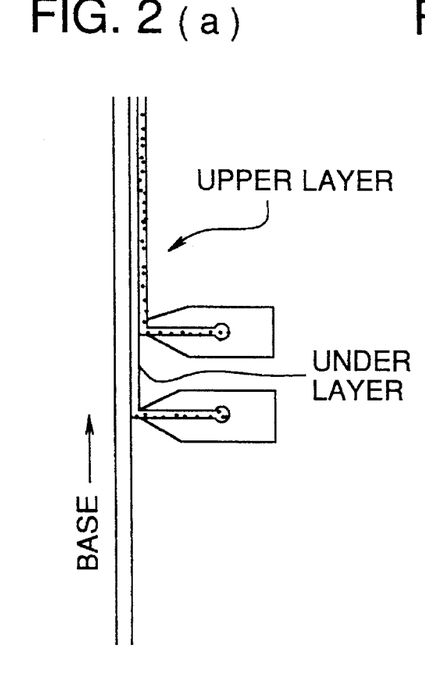
FIG. 2 is a diagram showing a coater head for coating the magnetic coating.
Figure 2B:
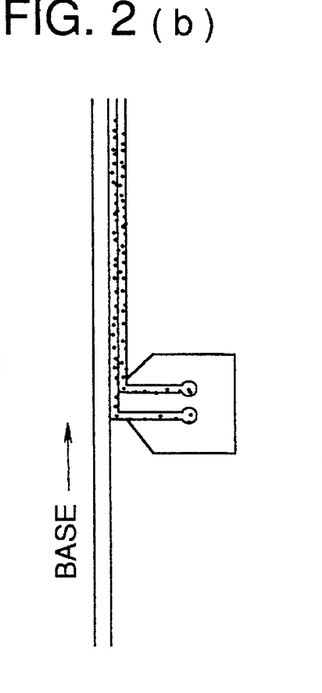
Figure 2C:
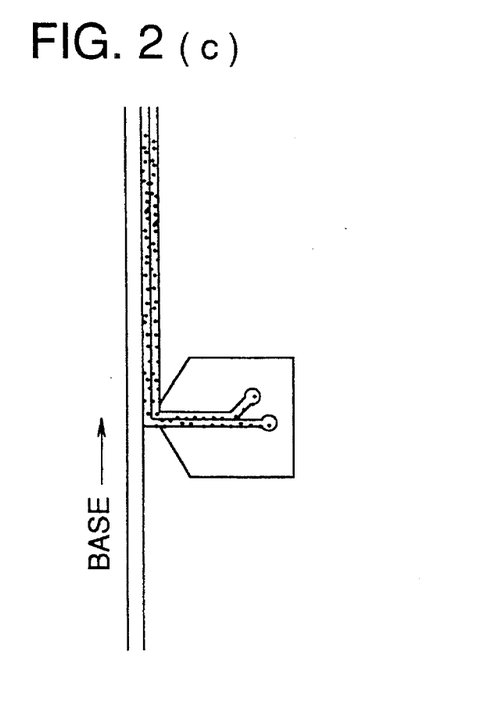

Head (c) shown in FIG. 2 is preferable as the aforementioned coater head in the invention.

A combination of a reverse roll and an extrusion coater or a combination of a gravure roll and an extrusion coater may also be used for the wet-on-wet multi-layer coating method. Further, an air-doctor coater, a blade coater, an air-knife coater, a squeeze coater, an impregnation coater, a transfer roll coater, a kiss coater, a cast coater and a spray coater may be combined for the coating method.

Since an upper magnetic layer is coated on a lower layer while the lower layer is wet in the wet-on-wet multi-layer coating, the surface of the lower layer (namely, a boundary surface between the upper layer and the lower layer) is made smooth, the surface nature of the upper layer is improved, and adhesiveness between the upper layer and the lower layer is also improved. As a result, requirements such as high output and low noise for high density recording which are required, for example, on a magnetic tape can be satisfied, layer-exfoliation is eliminated, layer strength is improved and durability is enhanced for the requirements of high durability. The wet-on-wet multi-layer coating can also reduce drop out and thereby improve reliability.

As a solvent combined with the aforementioned coating, or as a diluting solvent for coating thereof, ketones such as acetone, methylethytketone, methylisobutylketone and cyclohexanone; alcohol such as methanol, ethanol propanol and butanol; esters such as methyl acetate, ethyl acetate, butyl acetate, ethyl lactate and ethyleneglycolcenoacetate; ethers such as glycoldimethylether, glycolmonoethylether, dioxane and tetrahydrofuran; aromatic hydrogen carbon such as benzene, toluene and xylene; and hydrogen carbide halide such as methylenechloride, ethylenechloride, carbon tetrachloride, chloroform and dichlorobenzene may be used. These solvents may be used independently or in combination of not less than two kinds.

A magnetic field in the above-mentioned orientating magnet or a vertical orientating magnet is within a range of approximately 20–5000 gauss in strength, drying temperature of a drier is approximately 30°–120° C., and drying time is approximately 0.1–10 minutes.

After the foregoing, surface smoothing treatment through calendering is conducted.

After that, varnishing treatment or blade treatment is conducted at need before slitting. In this case, the surface smoothing treatment mentioned above is effective for achieving an object of the invention.

Namely, the surface smoothing treatment is preferable for satisfying the condition for the surface roughness of a magnetic layer that is one of the essential conditions of the invention as stated above.

In the surface smoothing treatment, temperature, line pressure and C/S (coating speed) may be given as calendering conditions.

For achieving the object of the invention, the temperature mentioned above is usually kept at 50°–120° C., the line pressure mentioned above is kept at 50–400 kg/cm and the C/S mentioned above is kept at 20–600 m/min, which is preferable. When the figures mentioned above can not be kept, it is difficult to keep the surface conditions of a magnetic layer specifically as in the invention, or it is sometimes impossible to do so.

EXAMPLE

Examples of the invention will be explained as follows.

In the invention, kinds of components, percentages thereof and sequence of operations shown below can be changed provided that they are within the range of the invention. Incidentally, an expression of "parts" appearing in the following examples means the parts by weight.

Example 1

The following magnetic components for an upper layer were kneaded for dispersion by means of a kneader sand mill for preparing the magnetic coating for the upper layer.

<Magntic Coating For An Upper Layer>

Fe—Al ferromagnetic metal powder . . . 100 parts (Fe:Al weight ratio=100:8, average major axis length; 0.16 μm, Hc;1580 Oe,$\sigma_s$;120 emu/g, crystallite size; 170 Å)

Sulfonic acid metal salt-containing vinylchloride resin <MR-110 made by Nippon Zeon Co.> . . . 10 parts Sulfonic acid metal salt-containing polyesterpolyurethane resin <UR-8700, made by Toyobo Co.> . . . 5 parts Alumina ($\alpha$-$Al_2O_3$, average particle size;0.2 μm) . . . 6 parts Carbon black <average particle size 40 nm> . . . 1 part Stearic acid . . . 1 part Myristic acid . . . 1 part Butylstearate . . . 1 part Cyclohexanone . . . 100 parts Methylethylketone . . . 100 parts Tolunene . . . 100 parts Coating for a lower layer having the following composition was prepared.

<Coating For A Lower Layer> Carbon black.(average particle size 27 nm, oil absorption 80 μl/100 g) . . . 90 parts Carbon black (average particle size 270 nm) . . . 10 parts Sulfonic acid metal salt-containing vinylchloride resin (MR-110 made by Nippon Zeon Co.) . . . 6 parts Sulfonic acid metal salt-containing polyesterpolyurethane resin (UR-8700 made by Toyobo Co.) . . . 3 parts Myristic acid . . . 1 part Butylstearate . . . 1 part Cyclohexanone . . . 100 parts Methylethylketone . . . 100 parts Tolunene . . . 100 parts Next, 5 parts of polyisocyanate (Colonate L made by Nippon Polyurethane Kogyo Co.) were added to each of the magnetic coating for an upper layer and that for a lower layer, and then each of them was coated on a polyethyleneterephthalate film having a thickness of 10 μm through the wet-on-wet method. After that, the coated layer was subjected to orientating treatment for the magnetic field while the layer is wet and then subjected to drying and surface smoothing treatment by means of a calender, thus a magnetic layer composed of a lower layer of 2.0 μm thick and an upper layer of 0.4 μm thick was formed.

In addition to the foregoing, coating having the following composition was coated on the surface (reverse side) of the aforementioned polyethyleneterephthalate film opposite to the side on which the magnetic layer is provided. After that, the coated layer was dried and was subjected to calendering treatment in accordance with calendering conditions which will be stated later, thus a back-coating layer of 0.8 μm thick was formed and a magnetic tape master roll which is a wide roll was prepared.

<Coating For A Back-Coat Layer>

Carbon black (Raven 1035) . . . 40 parts

Barium sulfate (average particle size 300 nm) . . . 10 parts

Nitrocellulose . . . 25 parts

Polyurethane resin (N-2301 made by Nippon Polyurethane Co.) . . . 25 parts

Polyisocyanate compound (Colonate L made by Nippon Polyurethane Co.) . . . 10 parts Cyclohexanone . . . 400 parts Methylethylketone . . . 250 parts Toluene . . . 250 parts Master rolls thus obtained were slit and tapes for an 8 mm video were prepared.

The tapes for video use thus prepared were subjected to measurement wherein an electromagnetic converting characteristic, coatability and running-durability were checked under the following conditions. The results thereof are shown in Table 1.

<RF Output>

The measurement was conducted by the use of Noise Meter 925C made by Shibasoku and 8 mm video movie V 900 (made by Sony).

<Running-Durability Under High Temperature and High Humidity>

Running test of 50 passes of total-length running for the video tape was conducted under the ambient conditions of temperature at 40° C. and relative humidity at 80%, and edge damage on the tape after running was checked visually.

Evaluation grades are as follows.

0: No edge damage

Δ: Occurrence of partial edge damage

X: Occurrence of edge damage on entire length

<Head Clogging At Low Temperature>

At the temperature of 0° C., the video tape was used for video recording and play-back, and the number of occasions of head clogging was counted.

<Calender heat roll contamination>

In the course of manufacturing the aforementioned master roll, contamination on a calender roll used for calendering treatment was checked visually. The evaluation grades are as follows.

⊚: No contamination
(Deterioration of Chroma S/N is less than 0.5 dB)

○:Almost no contamination
(Deterioration of Chroma S/N is not less than 0.5 dB and less than 1.0 dB)

Δ: Slightly contaminated
(Deterioration of Chroma S/N is not less than 1.0 dB and less than 2.0 dB)

X: Contaminated
(Deterioration of Chroma S/N is not less than 2.0 dB)

Example 2

In Example 2, magnetic tapes were prepared in the same manner as in Example 1 except that 95 parts of tin oxide-coated zinc oxide (having an average particle size of 30 nm) and 5 parts of tin oxide-coated zinc oxide (having an average particle size of 500 nm) were used in place of 90 parts of carbon black (having an average particle size of 27 nm) and 10 parts of carbon black (having an average particle size of 270 nm) both for coating for a lower layer, and the tapes were evaluated in the same manner as in Example 1. The results thereof are shown in Table 1.

Example 3

In Example 3, magnetic tapes were prepared in the same manner as in Example 1 except that Co-substitutd barium ferrite (Hc:1100 Oe, BET value: 45 m$^2$/g, σs: 64 emu/g, tabular ratio: 4) was used in place of Fe—Al ferromagnetic metal powder of the outermost layer as ferromagnetic metal powder in the aforementioned Example 1, and the tapes were evaluated in the same manner as in Example 1. The results thereof are shown in Table 1.

Example 4

In Example 4, magnetic tapes were prepared in the same manner as in Example 1 except that 95 parts of tin oxide with solid solution of antimony-coated titanium oxide (having an average particle size of 20 nm) and 5 parts of tin oxide with solid solution of antimony-coated titanium oxide (having an average particle size of 220 nm) were used in place of 90 parts of carbon black (having an average particle size of 27 nm) and 10 parts of carbon black (having an average particle size of 270 nm) both for coating for a lower layer, and the tapes were evaluated in the same manner as in Example 1. The results thereof are shown in Table 1.

Example 5

In Example 5, a lower layer in Example 1 was changed to be of a multi-layer type as follows.

<Coating A For A Lower Layer>

Carbon black (average particle size 27 nm) . . . 100 parts

Sulfonic acid metal salt-containing vinyl chloride resin (MR-110 made by Nippon Zeon Co.) . . . 6 parts Sulfonic acid metal salt-containing polyesterpolyurethane resin (UR-8700 made by Toyobo Co. ) . . . 3 parts Myristic acid . . . 1 part Butylstearate . . . 1 part Cyclohexanone . . . 100 parts Methylethylketone . . . 100 parts Tolunene . . . 100 parts <Coating B For A Lower Layer>

Carbon black (average particle size 270 nm) . . . 100 parts

Sulfonic acid metal salt-containing vinyl chloride resin (MR-110 made by Nippon Zeon Co.) . . . 6 parts Sulfonic acid metal salt-containing polyesterpolyurethane resin (UR-8700 made by Toyobo Co.) . . . 3 parts
  Myristic acid . . . 1 part
  Butylstearate . . . 1 part
  Cyclohexanone . . . 100 parts
  Methylethylketone . . . 100 parts
  Tolunene . . . 100 parts In Example 5, magnetic tapes were prepared in the same manner as in Example 1 except that 5 parts of polyisocyanate (Colonate L made by Nippon Polyurethane Kogyo Co.) were added to each of the magnetic coating for an upper layer and those A and B for a lower layer, and then each of them was coated on a polyethyleneterephthalate film having a thickness of 10 μm through the wet-on-wet method, and after that, the coated layer was subjected to orientating treatment for the magnetic field while the layer is wet and then subjected to drying and surface smoothing treatment by means of a calender, thus a magnetic layer composed of lower layer A of 1.5 μm thick, lower layer B of 0.3 μm thick on the layer A and an upper layer of 0.4 μm thick on the layer B was formed. The tapes thus prepared were evaluated in the same manner as in Example 1. The results thereof are shown in Table 1.

In Example 6, magnetic coating for an upper layer in Example 1 was prepared in two kinds, one is magnetic coating A for an upper layer and the other is magnetic coating B for an upper layer. The magnetic coating A was made to be the same as the magnetic coating for an upper layer in Example 1. With regard to magnetic coating B for an upper layer, preparation was made in the same manner as in Example 1 except that 100 parts of Fe—Al ferromagnetic metal powder (Fe:Al weight ratio=100:8, average major axis length; 0.20 μm, Hc; 1500 Oe, $\sigma_S$; 120 emu/g, crystallite size; 190 Å) were used in place of 100 parts of Fe—Al ferromagnetic metal powder (Fe:Al weight ratio=100:8, average major axis length; 0.16 μm, Hc; 1580 Oe, $\sigma_S$; 120 emu/g, crystallite size; 170 Å). These magnetic coatings A and B for an upper layer were used for preparing, in the same manner as in Example 1, the same magnetic recording medium as in the previous Example except that the magnetic recording medium is provided with outermost magnetic layer A of 0.2 μm thick and upper magnetic layer of 0.2 μm thick. The tapes thus prepared were evaluated in the same manner as in Example 1. The results thereof are shown in Table 1.

Comparative Example 1

In Comparative Example 1, magnetic tapes were prepared in the same manner as in Example 1 except that 100 parts of carbon black (having an average particle size of 27 nm) was used and no carbon balck (having an average particle size of 270 nm) was used as components of coating for a lower layer in place of 90 parts of carbon black (having an average particle size of 27 nm) and 10 parts of carbon black (having an average particle size of 270 nm) in Example 1. The tapes were evaluated in the same manner as in Example 1. The results thereof are shown in Table 1.

Comparative Example 2

In Comparative Example 2, magnetic tapes were prepared in the same manner as in the aforementioned Example 2 except that 100 parts of tin oxide-coated zinc oxide (having an average particle size of 30 nm) and no tin oxide-coated zinc oxide (having an average particle size of 500 nm) were used in place of 90 parts of carbon black (having an average particle size of 27 nm) and 10 parts of carbon black (having an average particle size of 270 nm) both for coating for a lower layer, and the tapes were evaluated in the same manner as in Example 2. The results thereof are shown in Table 1.

Comparative Example 3

In Comparative Example 3, magnetic tapes were prepared in the same manner as in Example 3 except that 100 parts of carbon black (having an average particle size of 27 nm) was used and no carbon black (having an average particle size of 270 nm) was used as components of coating for a lower layer in place of 90 parts of carbon black (having an average particle size of 27 nm) and 10 parts of carbon black (having an average particle size of 270 nm) in Example 3. The tapes were evaluated in the same manner as in Example 3. The results thereof are shown in Table 1.

Example 7

In Example 7, magnetic tapes were prepared in the same manner as in Example 1 except that 70 parts of carbon black (having an average particle size of 27 nm) and 30 parts of tin oxide-coated zinc oxide (having an average particle size of 30 nm) were used as components of coating for a lower layer in place of 90 parts of carbon black (having an average particle size of 27 nm) and 10 parts of carbon black (having an average particle size of 270 nm) in Example 1. The tapes were evaluated in the same manner as in Example 1. The results thereof are shown in Table 1.

Comparative Examples 4 and 5

In Comparative Examples 4 and 5, magnetic tapes were prepared in the same manner as in Example 1 except that the thickness of the outermost layer in the Example 1 was changed to 0.7 μm in the Comparative Example 4 and that was changed to 1.0 μm in the Comparative Example 5. The tapes were evaluated in the same manner as in Example 1. The results thereof are shown in Table 1.

Example 8

In Example 8, preparation was made in the same manner as in Example 1 except that 100 parts of Fe—Al—Ca ferromagnetic metal powder (Fe:Al;Ca weight ratio= 100:8;1, average major axis length; 0.16 μm, Hc; 1580 Oe, $\sigma_S$; 120 emu/g, crystallite size; 170 Å) were used in place of 100 parts of Fe—Al ferromagnetic metal powder (Fe:Al weight ratio=100:8, average major axis length; 0.16 μm, Hc; 1580 Oe, $\sigma_S$; 120 emu/g, crystallite size; 170 Å). The tapes thus prepared were evaluated in the same manner as in Example 1. The results thereof are shown in Table 1.

Example 9

In Example 9, preparation was made in the same manner as in Example 1 except that 100 parts of Fe—Al ferromagnetic metal powder (Fe:Al weight ratio=100:8, average major axis length; 0.16 μm, Hc; 1580 Oe, $\sigma_S$; 120 emu/g, axial ratio; 3.0) were used in place of 100 parts of Fe—Al ferromagnetic metal powder (Fe:Al weight ratio=100:8, average major axis length; 0.16 μm, Hc; 1580 Oe, $\sigma_S$; 120 emu/g, crystallite size; 170 Å) .for magnetic coating of an upper layer. The tapes thus prepared were evaluated in the same manner as in Example 1. The results thereof are shown in Table 1.

TABLE 1

| | Example | | | | | | | | | Comparative Example | | | | |
|---|---|---|---|---|---|---|---|---|---|---|---|---|---|---|
| | 1 | 2 | 3 | 4 | 5 | 6 | 7 | 8 | 9 | 1 | 2 | 3 | 4 | 5 |
| Rf output | +3.3 | +3.2 | +4.3 | +3.3 | +3.4 | +4.0 | +3.3 | +4.3 | +4.5 | +2.4 | +2.3 | +3.4 | +3.3 | +3.3 |
| Running-durability | O | O | O | O | O | O | O | O | O | X | X | X | X | X |
| Head clogging disposition | O | O | O | O | O | O | 2 | O | O | 8 | 10 | 12 | 8 | 15 |
| Calender heat roll contamination | ⊙ | ⊙ | ⊙ | ⊙ | ⊙ | ⊙ | O | ⊙ | ⊙ | X | X | X | X | X |

[Effect of the Invention]

The invention provides a magnetic recording medium having excellent properties such as excellent running-durability under high temperature and humidity, no head clogging at low temperature, and no contamination of calender heat rolls.

Example 10

The following magnetic components for aN upper layer were kneaded for dispersion by means of a kneader sand mill for preparing the magnetic coating for the upper layer.

<Magntic Coating A For An Upper Layer>

Fe—Al ferromagnetic metal powder . . . 100 parts (Fe:Al weight ratio=100:8, average major axis length; 0.16 μm, Hc;1580 Oe,$\sigma_s$;120 emu/g, axial ratio; 8, crystallite size;170 Å)

Sulfonic acid metal salt-containing vinylchloride resin <MR-110 made by Nippon Zeon Co.> . . . 10 parts Sulfonic acid metal salt-containing polyesterpolyurethane resin <UR-8700, made by Toyobo Co.> . . . 5 parts Alumina ($\alpha$-$Al_2O_3$, average particle size; 0.2 μm) . . . 6 parts Carbon black <average particle size 40 nm> . . . 1 part Stearic acid . . . 1 part Myristic acid . . . 1 part Butylstearate . . . 1 part Cyclohexanone . . . 100 parts Methylethylketone . . . 100 parts Tolunene . . . 100 parts <Coating C For A Lower Layer>

$TiO_2$ (average particle size $A_1$; described in Table 1) . . . 90 parts

Carbon black. (average particle size $B_1$; described in Table 1) . . . 10 parts Sulfonic acid metal salt-containing vinylchloride resin (MR-110 made by Nippon Zeon Co.) . . . 6 parts Sulfonic acid metal salt-containing polyesterpolyurethane resin (UR-8700 made by Toyobo Co.) . . . 3 parts Alumina ($\alpha$-$Al_2O_3$, average particle size: 0.2 μm) . . . 6 parts Myristic acid . . . 1 part Butylstearate . . . 1 part Cyclohexanone . . . 100 parts Methylethylketone . . . 100 parts Tolunene . . . 100 parts

[Coating B For An Upper Layer]

Coating B is the same as Coating A except that Co-substituted barium ferrite (Hc: 1100 Oe, BET 45 m²/g, σs: 64 emu/g, tabular ratio 4) was used in place of Fe—Al ferromagnetic powder in Coating A for an upper layer.

[Coating D For A Lower Layer]

Coating D is the same as Coating C except that $SnO_2$ was used in place of carbon black in Coating C for a lower layer.

[Coating E for a Lower Layer]

Coating E is the same as Coating C except that $CaCO_3$ was used in place of $TiO_2$ in Coating C for a lower layer.

[Coating F For A Lower Layer]

Coating F is the same as Coating C except that 5 parts of $BaSO_4$ (average particle size $A_1$: described in Table 1) and 95 parts of carbon black (average particle size $B_1$: described in Table 1) were used in place of $TiO_2$ in Coating C for a lower layer.

[Coating G For A Lower Layer]

Coating G is the same as Coating F except that ZnO was used in place of $BaSO_4$ in Coating F for a lower layer.

[Coating H For A Lower Layer]

Coating H is the same as Coating C except that 100 parts of carbon black were used without using $TiO_2$ in Coating C for a lower layer.

[Coating I For A Lower Layer]

Coating I is the same as Coating C except that 100 parts of $TiO_2$ were used without using carbon black in Coating C for a lower layer.

[Coating J For A Lower Layer]

Coating J is the same as Coating C except that Fe—Si—Al Sendust alloy powder (coercive force Hc=40 A/m, μi=200 H/m, particle size 50 nm) was used in place of $TiO_2$ in Coating C for a lower layer.

Next, 5 parts of polyisocyanate (Colonate L made by Nippon Polyurethane Kogyo Co.) were added to each of the magnetic coating for an upper layer and that for a lower layer, and then each of them was coated on a polyethyleneterephthalate film having a thickness of 10 μm through the wet-on-wet method, and after that, the coated layer was subjected to orientating treatment for the magnetic field while the layer is wet and then subjected to drying and surface smoothing treatment by means of a calender, thus a magnetic layer composed of a lower layer of 2.0 μm thick and an upper layer of 0.4 μm thick.

In addition to the foregoing, coating having the following composition was coated on the surface (reverse side) of the aforementioned polyethyleneterephthalate film opposite to the side on which the magnetic layer is provided. After that, the coated layer was dried and was subjected to calendering treatment in accordance with calendering conditions which will be stated later, thus a back-coat layer of 0.8 μm thick was formed and a magnetic tape master roll which is a wide roll was prepared.

[Coating For A Back-Coat Layer]

Carbon black (Raven 1035) . . . 40 parts

Barium sulfate (average particle size 300 nm) . . . 10 parts

Nitrocellulose . . . 25 parts

Polyurethane resin (N-2301 made by Nippon Polyurethane Co.) . . . 25 parts

Polyisocyanate compound (Colonate L made by Nippon Polyurethane Co.) . . . 10 parts Cyclohexanone . . . 400 parts Methylethylketone . . . 250 parts Toluene . . . 250 parts Master rolls thus obtained were slit and tapes for an 8 mm video were prepared.

The tapes for video use thus prepared were subjected to measurement wherein an electromagnetic converting characteristic, coatability and running-durability were checked under the following conditions. The results thereof are shown in Table 2.

(CN Characteristic)

A single wave having a frequency of 9 MHz was recorded on the tape and signals therefrom are reproduced, and a level of output of the reproduction was expressed, being compared with a reference sample.

(Overwrite Characteristic)

Signals having a frequency of 2 MHz were recorded on the tape at the saturated level, and then the signals having a frequency of 9 MHz were recorded on the tape where 2 MHz signals had been recorded (overwrite). After that, a level of residual output for the 2 MHz signals was measured. An assumption, in this case, is that the lower the residual output level is, the better the overwrite characteristic is.

(Surface Specific Resistance)

Under the following conditions, each tape loaded in a cassette to be a video cassette was subjected to measurement of surface specific resistance.

Each tape was sandwiched between electrodes each having a width of 8 mm, loads were applied on both ends thereof, and voltage of 500 V was applied on the electrodes. Under the conditions mentioned above, electric resistance was measured.

(Running-Durability)

Running test of 200 passes repetition of reproduction for the tape head portion equivalent to 5 minutes was made using S-550 (made by Sony) under the ambient conditions of temperature at 20° C. and relative humidity at 60%, and edge damage on the tape after running was checked.

TABLE 2

| | Upper layer coating | Lower layer coating | Lower layer particle size | | Layer thickness upper/lower (μm) | CN characteristic | Overwrite characteristic | Surface specific resistance | Running-durability |
| | | | A1 | B1 | | | | | |
| --- | --- | --- | --- | --- | --- | --- | --- | --- | --- |
| Example 10 | A | C | 30 | 27 | 0.4/2.0 | 2.7 | −55.0 | $2 \times 10^7$ | 200 passes or more |
| Example 11 | A | D | 30 | 40 | 0.4/2.0 | 2.5 | −55.0 | $1 \times 10^8$ | 200 passes or more |
| Example 12 | A | E | 50 | 27 | 0.4/2.0 | 2.2 | −55.0 | $5 \times 10^7$ | 200 passes or more |
| Example 13 | A | F | 60 | 20 | 0.4/2.0 | 2.2 | −55.0 | $3 \times 10^5$ | 200 passes or more |
| Example 14 | A | G | 80 | 20 | 0.4/2.0 | 2.1 | −55.0 | $4 \times 10^5$ | 200 passes or more |
| Example 15 | B | C | 30 | 27 | 0.4/2.0 | 3.2 | −56.0 | $1 \times 10^8$ | 200 passes or more |
| Example 16 | B | D | 30 | 40 | 0.4/2.0 | 3.1 | −56.0 | $1 \times 10^8$ | 200 passes or more |
| Example 17 | A | C | 15 | 20 | 0.4/2.0 | 2.9 | −55.0 | $3 \times 10^7$ | 200 passes or more |
| Example 18 | A | C | 50 | 75 | 0.4/2.0 | 2.3 | −55.0 | $5 \times 10^7$ | 200 passes or more |
| Example 19 | A | C | 30 | 27 | 0.2/2.0 | 3.0 | −58.0 | $1 \times 10^7$ | 200 passes or more |
| Example 20 | A | C | 2 | 27 | 0.4/2.0 | 1.7 | −55.0 | $1 \times 10^8$ | Edge damage at 10 passes |
| Example 21 | A | C | 100 | 27 | 0.4/2.0 | 0.6 | −55.0 | $5 \times 10^7$ | Edge damage at 100 passes |
| Example 22 | A | C | 30 | 97 | 0.4/2.0 | 0.9 | −55.0 | $5 \times 10^7$ | Edge damage at 100 passes |

TABLE 2-continued

|  | Upper layer coating | Lower layer coating | Lower layer particle size A1 | Lower layer particle size B1 | Layer thickness upper/lower (μm) | CN characteristic | Overwrite characteristic | Surface specific resistance | Running-durability |
|---|---|---|---|---|---|---|---|---|---|
| Comparative Example 6 | A | C | 100 | 27 | 1.0/2.0 | 1.5 | −38.0 | $1 \times 10^9$ | Edge damage at 30 passes |
| Example 23 | B | C | 2 | 27 | 0.4/2.0 | 1.6 | −55.0 | $1 \times 10^8$ | Edge damage at 10 passes |
| Comparative Example 7 | A | H | — | 27 | 0.4/2.0 | −0.5 | −55.0 | $2 \times 10^5$ | Edge damage at 5 passes |
| Comparative Example 8 | A | I | 30 | — | 0.4/2.0 | 1.7 | −55.0 | $1 \times 10^{11}$ | Edge damage at 100 passes |
| Example 24 | A | J | 50 | 27 | 0.4/2.0 | 2.9 | −56.0 | $2 \times 10^7$ | 200 passes or more |

Example 25

Magnetic coating having the following composition was prepared.

<Magnetic Coating K For An Outermost Magnetic Layer>

Co—γ—FeOx (1) (1.33<x≦1.5) . . . 100 parts
(average major axis length 0.21 μm, coercive force Hc;1200 Oe, crystallite size;200 Å)
Vinylchloride resin (MR 110 made by Nippon Zeon Co.) . . . 6 parts
Sulfonic acid metal salt-containing polyurethane resin. (UR 8700 made by Toyobo Co.) . . . 4 parts
α-Alumina (average particle size; 0.1 μm) . . . 5 parts
Carbon black <average particle size 40 nm> . . . 0.5 parts
Myristic acid . . . 1 part
Stearic acid . . . 1 part
Butylstearate . . . 1 part
Methylethylketone . . . 100 parts
Tolunene . . . 100 parts
Cyclohexanone . . . 100 parts After the aforementioned composite was kneaded for dispersion, 3 parts of polyisocyanate compound (Colonate L) were added thereto for preparation.

<Magnetic Coating L For An Outermost Magnetic Layer>

Magnetic coating L for an outermost magnetic layer was prepared in the same manner as that for Magnetic coating K for an outermost magnetic layer except that Fe—Al ferromagnetic powder (average major axis length 0.16 μm, coercive force Hc=1500 Oe, crystallite size 150 Å) was used in place of Co—γ—FeOx (1) in Magnetic coating K for an outermost magnetic layer mentioned above.

<Magnetic Coating M For An Outermost Magnetic Layer>

Magnetic coating M for an outermost magnetic layer was prepared in the same manner as that for Magnetic coating K for an outermost magnetic layer except that Co—γ—FeOx (2) (average major axis length 0.28 μm, coercive force Hc=1200 Oe, crystallite size 300 Å) was used in place of Co—γ—FeOx (1) in Magnetic coating K for an outermost magnetic layer mentioned above.

<Coating a For A Non-magnetic Layer>

Titanium oxide (1) (TiO$_2$, crystallite size 300 Å) . . . 100 parts
Vinylchloride resin (MR 110 made by Nippon Zeon Co.) . . . 3 parts
Sulfonic acid metal salt-containing polyurethane resin.(UR 8700 made by Toyobo Co.) . . . 9 parts
Methylethylketone . . . 50 parts
Tolunene . . . 50 parts
Cyclohexanone . . . 50 parts The aforementioned composite was kneaded and dispersed for preparation.

<Coating b For A Non-magnetic Layer>

Coating b for a non-magnetic layer was prepared in the same manner as that for the aforementioned Coating b for a non-magnetic layer except that titanium oxide (2) (crystallite size 30 Å) was used in place of titanium oxide (1) in the aforementioned coating a for a non-magnetic layer.

<Coating c For A Non-magnetic Layer>

Coating c for a non-magnetic layer was prepared in the same manner as that for the aforementioned Coating a for a non-magnetic layer except that titanium oxide (3) (crystallite size 20 Å) was used in place of titanium oxide (1) in the aforementioned coating a for a non-magnetic layer.

<Coating d For A Non-magnetic Layer>

Coating d for a non-magnetic layer was prepared in the same manner as that for the aforementioned Coating a for a non-magnetic layer except that α-Fe$_2$O$_3$ (red iron oxide) (crystallite size 380 Å) was used in place of titanium oxide (1) in the aforementioned coating a for a non-magnetic layer.

<Magnetic Coating N For A Lower Layer>

Magnetic coating M for an outermost magnetic layer was prepared in the same manner as that for Magnetic coating A for an outermost magnetic layer except that Co-γ-FeOx (3)

(average major axis length 0.28 μm, coercive force Hc=700 Oe, crystallite size 330 Å) was used in place of Co-γ-FeOx (1) in Magnetic coating A for an outermost magnetic layer mentioned above.

Examples 25–33 and Comparative Examples 9–15

Based on the coated layer structure shown in Table 3, magnetic recording media having a width of 8 mm were prepared through a wet-on-wet method. These magnetic recording media were subjected to the following evaluation tests.

<C/N Characteristic>

A single wave having a frequency of 9 MHz was recorded on the magnetic recording medium by means of an 8 mm video tape recorder available on the market, and signals therefrom are reproduced, and a level of output of the reproduction was measured and expressed through a comparison with a reference sample (Comparative Example 1).

<Overwrite Characteristic>

Signals having a frequency of 2 MHz were recorded on the magnetic recording medium at the saturated level, and then the signals having a frequency of 9 MHz were recorded on the same magnetic recording medium on which 2 MHz signals had been recorded (overwrite). After that, a level of residual output for the 2 MHz signals was measured. An assumption, in this case, is that the lower the residual output level is, the better the overwrite characteristic is.

<Light Transmissivity>

Under the conditions of a tungsten lamp (color temperature 2000 K) as a light source and a silicone photodiode (EE-D 55 made by Tateishi Electric Co., $\lambda_p$=870 nm) as a light acceptance element, the light transmissivity of the magnetic recording medium was measured at two points of 940 nm and 270 nm in wavelength which are the wavelength of the maximum sensitivity in terms of wavelength characteristic concerning the sensitivity of a measuring instrument and that of the half-value width respectively.

<Discontinuation of Running>

Using 10 tape deck units available on the market and 10 rolls for each sample tape, the number of turns where loading was released at a leading edge or a trailing edge of the tape or on the half way of running, was measured.

The results of evaluation mentioned above are shown in Table 3. From the above evaluation results, the samples were evaluated collectively in terms of quality.

TABLE 3

| | Outermost layer | | | Lower layer | | | Layer thickness upper/lower (μ/m) | CN characteristic (dB) | Overwrite characteristic (dB) | Light transmissivity | Discontinuation of running |
|---|---|---|---|---|---|---|---|---|---|---|---|
| | Type of coating | Average major axis length μm | Crystallite size (Å) | Type of coating | Crystallite size (Å) | Mixture ratio | | | | | |
| Comparative example 9 | K | 0.21 | 200 | — | — | — | 3.0/— | 0 | −31.0 | 28.0 | 10 |
| Comparative example 10 | L | 0.16 | 150 | — | — | — | 3.0/— | 1.0 | −28.0 | 0.1 | 0 |
| Example 25 | K | 0.21 | 200 | a/b | 300/30 | 6/4 | 0.4/2.6 | 1.6 | −54.0 | 0.7 | 0 |
| Example 26 | K | 0.21 | 200 | a/b | 300/30 | 8/2 | 0.4/2.6 | 1.4 | −53.5 | 0.3 | 0 |
| Example 27 | L | 0.16 | 150 | a/b | 300/30 | 6/4 | 0.4/2.6 | 2.5 | −51.5 | 0.4 | 0 |
| Example 28 | L | 0.16 | 150 | a/b | 300/30 | 8/2 | 0.4/2.6 | 2.2 | −51.0 | 0.3 | 0 |
| Example 29 | L | 0.16 | 150 | a/c | 300/20 | 8/2 | 0.4/2.6 | 2.7 | −52.0 | 0.4 | 0 |
| Example 30 | L | 0.16 | 150 | d/c | 380/20 | 8/2 | 0.4/2.6 | 2.0 | −51.5 | 0.2 | 0 |
| Example 31 | L | 0.16 | 150 | a/c | 300/20 | 8/2 | 0.2/2.8 | 2.8 | −53.0 | 0.6 | 0 |
| Example 32 | M | 0.28 | 300 | a/b | 300/30 | 8/2 | 0.4/2.6 | −2.0 | −52.0 | 0.3 | 0 |
| Comparative example 11 | L | 0.16 | 150 | N | 300 | — | 0.4/2.6 | 1.1 | −30.5 | 1.2 | 0 |
| Comparative example 12 | L | 0.16 | 150 | a | 300 | — | 0.4/2.6 | 0.6 | −51.0 | 0.9 | 0 |
| Comparative example 13 | K | 0.21 | 200 | c | 20 | — | 0.4/2.6 | 0.8 | −53.0 | 9.8 | 10 |
| Comparative example 14 | L | 0.16 | 150 | c | 20 | — | 0.4/2.6 | 1.2 | −51.0 | 6.0 | 7 |
| Comparative example 15 | L | 0.16 | 150 | — | — | — | 0.4/— | −1.7 | −50.5 | 15.2 | 10 |
| Example 33 | L | 0.16 | 150 | a/b | 300/30 | 6/4 | 0.4/0.5 | 3.0 | −51.5 | 0.7 | 0 |

Examples 34–45

In the invention, kinds of components, percentages thereof and sequence of operations shown below can be changed provided that they are within the range of the invention. Incidentally, an expression of "parts" appearing in the following examples means the parts by weight.

Magnetic coatings having the below composition were prepared.

[Magnetic Coating A For An Outermost Layer]

Fe—Al ferromagnetic powder . . . 100 parts
(average major axis length=0.15 μm, Hc=1600 Oe, saturated magnetization 125 emu/g)

Vinylchloride resin (MR 110 made by Nippon Zeon Co.) . . . 5 parts

Sulfonic acid metal salt-containing polyurethane resin (UR-8700, made by Toyobo Co.) . . . 3 parts α-Alumina (particle size; 0.1 μm) . . . 5 parts Carbon black (particle size 40 nm) . . . 0.5 part Myristic acid . . . 1 part Stearic acid . . . 1 part Butylstearate . . . 1 part Methylethylketone . . . 100 parts Tolunene . . . 100 parts Cyclohexanone . . . 100 parts The mixture composed of the above-mentioned components were kneaded for dispersion and polyisocyanate compounds (5 parts of Colonete L) were added to the mixture.

[Magnetic Coating B For An Outermost Layer]

Magnetic coating B for an outermost layer was prepared in the same manner as that for the aforementioned magnetic coating A for an outermost layer except that barium ferrite magnetic powder (coercive force Hc=1200 Oe, BET value 40 m²/g, average tabular ratio=3.5, σs=65 emu/g) was used in place of 100 parts of Fe—Al magnetic powder in the magnetic coating A for an outermost layer.

[Coating a For A Non-magnetic Powder-containing Layer]

Titanium oxide (1) (TiO$_2$, particle size 0.1 μm) . . . 100 parts

Vinylchloride resin (MR 110 made by Nippon Zeon Co.) . . . 1 part

Sulfonic acid metal salt-containing polyurethane resin (UR-8700, made by Toyobo Co.) . . . 4 parts Methylethylketone . . . 50 parts Tolunene . . . 50 parts Cyclohexanone . . . 50 parts The mixture composed of the aforementioned components was kneaded for dispersion for preparation.

[Coating b For A Non-magnetic Powder-containing Layer]

Coating b for a non-magnetic powder-containing layer was prepared in the same manner as that for the aforesaid coating a for a non-magnetic powder-containing layer except that 100 parts of titanium oxide (2) (TiO$_2$, particle size 0.03 μm) were used in place of 100 parts of titanium oxide (1) in the aforementioned coating a for a non-magnetic powder-containing layer.

[Coating c For A High Permeability Material-containing Layer]

Coating c for a high permeability material-containing layer was prepared in the same manner as that for the aforementioned coating a for a non-magnetic powder-containing layer except that 100 parts of Fe—Si—Al Sendust alloy powder [Hc=40 (A/m), μi=200 (H/m), particle size 0.1 μm] were used in place of 100 parts of titanium oxide (1) in the above-mentioned coating a for a non-magnetic powder-containing layer.

[Coating d For A High Permeability Material-containing Layer]

Coating d for a high permeability material-containing layer was prepared in the same manner as that for the aforementioned coating a for a non-magnetic powder-containing layer except that 100 parts of Mn—Zn ferrite [composition of MnO: 18% by weight, ZnO: 14% by weight and Fe$_2$O$_3$: 68% by weight, Hc=700 (A/m), μi=80 (H/m), particle size 0.1 μm] were used in place of 100 parts of titanium oxide (1) in the above-mentioned coating a for a non-magnetic powder-containing layer.

With regard to coercive force Hc of a high permeability material, an external magnetic field was measured by VSM at 1 T (tesla) in all cases.

The symbol μi is represented by the following expression at the origin of the magnetization curve.

[Expression 1]

$$\mu i = \frac{1}{\mu o} \lim_{H \to O} \frac{B}{H}$$

Based on the coated layer structure of the composition shown in Table 1, magnetic recording media having a width of 8 mm were prepared through a wet-on-wet method. The magnetic recording media thus prepared were subjected to the following evaluation tests.

<CN Characteristic>

A single wave having a frequency of 9 MHz was recorded on the tape and signals therefrom are reproduced, and a level of output of the reproduction was expressed, being compared with a reference sample.

<Overwrite Characteristic>

Signals having a frequency of 2 MHz were recorded on the tape at the saturated level, and then the signals having a frequency of 9 MHz were recorded on the tape where 2 MHz signals had been recorded (overwrite). After that, a level of residual output for the 2 MHz signals was measured. An assumption, in this case, is that the lower the residual output level is, the better the overwrite characteristic is.

<Weather-Fastness>

An output level of the sample at 9 MHz was measured in advance, and the sample was kept under the ambient conditions of 60° C. in temperature and 80% in humidity for 7 days. After that, the output level of the sample at 9 MHz was measured again and it was compared with the original measured value to obtain the difference between them.

Comparative Examples 16 and 17

Magnetic recording media each having a single magnetic layer were prepared by the use of coating for an outermost layer shown in Table 1, and they were subjected to evaluation tests similar to those for the aforementioned Examples.

Comparative Examples 18–20

Magnetic recording media each having two magnetic layers were prepared by the use of coating for an outermost layer and coating for a lower layer shown in Table 1, and they were subjected to evaluation tests similar to those for the aforementioned Examples.

Comparative Example 21

Magnetic recording media of an evaporation type comprising a non-magnetic support having thereon evaporated Co—Ni alloy, and they were subjected to evaluation tests similar to those for the aforementioned Examples.

The results are shown in Table 4.

TABLE 4

| | Coating for an upper layer | Coating for a lower layer | Layer thickness upper/lower (μ/m) | CN characteristic (dB) | Overwrite characteristic (dB) | Weather-fastness (dB) |
|---|---|---|---|---|---|---|
| Comparative Example 16 | A | — | 3.0/— | 0.3 | −28.0 | −0.5 |
| Comparative Example 17 | B | — | 3.0/— | 0 | −32.0 | −0.1 |
| Example 34 | A | a | 0.3/0.4 | 1.0 | −52.0 | −0.5 |
| Example 35 | A | b | 0.3/0.4 | 1.3 | −52.5 | −0.4 |
| Example 36 | A | c | 0.3/0.4 | 1.5 | −54.5 | −0.4 |
| Example 37 | A | d | 0.3/0.4 | 1.6 | −55.5 | −0.5 |
| Example 38 | B | a | 0.3/0.4 | 0.8 | −56.0 | −0.1 |
| Example 39 | B | b | 0.3/0.4 | 1.1 | −56.0 | 0 |
| Example 40 | B | c | 0.3/0.4 | 1.3 | −57.5 | −0.1 |
| Example 41 | B | d | 0.3/0.4 | 1.3 | −58.0 | −0.1 |
| Example 42 | A | b | 0.2/0.2 | 1.5 | −54.0 | −0.6 |
| Example 43 | A | d | 0.2/0.3 | 1.8 | −57.0 | −0.7 |
| Example 44 | B | b | 0.2/0.2 | 1.3 | −58.0 | −0.2 |
| Example 45 | B | d | 0.2/0.3 | 1.5 | −59.0 | −0.2 |
| Comparative Example 18 | A | a | 0.3/0.6 | 0.2 | −52.0 | −0.5 |
| Comparative Example 19 | A | a | 0.3/1.0 | −0.2 | −51.5 | −0.5 |
| Comparative Example 20 | B | a | 0.3/0.6 | −0.1 | −55.5 | −0.2 |
| Comparative Example 21 | D | — | 2000Å/— | 2.0 | −60.0 | −7.5 |

It is apparent, from the results shown in Table 4, that the Examples of the invention are more excellent than Comparative Examples.

Magnetic recording media of the invention are excellent in characteristics of high frequency and overwrite of signals, and offer excellent effect on weather-fastness.

What is claimed is:

1. A magnetic recording medium comprising:

a non-magnetic support;

an outermost magnetic layer containing a first binder and at least one powder selected from the group consisting of ferromagnetic metal powder and hexagonal ferrite powder, said outermost magnetic layer having a thickness of less than 0.5 μm; and an inner layer, adjacent to said outermost layer, containing a second binder, a first non-magnetic powder having a first average particle size of 10 to 30 nm, and a second non-magnetic powder having a second average particle size of not less than 40 nm.

2. The magnetic recording medium of claim 1 wherein a difference in average particle size between said first non-magnetic powder and said second non-magnetic powder is not less than 10 nm.

3. The magnetic recording medium of claim 1 wherein said outermost magnetic layer has a thickness of 0.1 to 0.4 μm.

4. The magnetic recording medium of claim 1 wherein said ferromagnetic metal powder is a Fe—Al metallic powder.

5. The magnetic recording medium of claim 4 wherein said Fe—Al metallic powder has an average axis length of 0.01 to 0.17 μm.

6. The magnetic recording medium of claim 1 wherein said hexagonal ferrite powder is a barium ferrite powder.

* * * * *